US012292714B2

(12) United States Patent
Stranczl et al.

(10) Patent No.: US 12,292,714 B2
(45) Date of Patent: May 6, 2025

(54) MICROMECHANICAL MECHANISM PROVIDED WITH A PERCUSSION ACTUATION SYSTEM, IN PARTICULAR FOR HOROLOGY

(71) Applicant: Montres Breguet S.A., L'Abbaye (CH)

(72) Inventors: Marc Stranczl, Nyon (CH); Polychronis Nakis Karapatis, Premier (CH)

(73) Assignee: Montres Breguet S.A., L'Abbaye (CH)

( * ) Notice: Subject to any disclaimer, the term of this patent is extended or adjusted under 35 U.S.C. 154(b) by 345 days.

(21) Appl. No.: 17/838,651

(22) Filed: Jun. 13, 2022

(65) Prior Publication Data

US 2022/0397864 A1 Dec. 15, 2022

(30) Foreign Application Priority Data

Jun. 15, 2021 (EP) .................................... 21179632

(51) Int. Cl.
*G04B 21/06* (2006.01)

(52) U.S. Cl.
CPC .................................... *G04B 21/06* (2013.01)

(58) Field of Classification Search
CPC ................................ G04B 21/06; G04B 15/14
See application file for complete search history.

(56) References Cited

U.S. PATENT DOCUMENTS

2012/0147715 A1* 6/2012 Karapatis ............. G04B 23/028 368/267
2012/0207001 A1* 8/2012 Pittet ...................... G05D 13/24 368/243
2016/0299472 A1* 10/2016 Legeret ................ G04B 23/023
2017/0242403 A1* 8/2017 Di Domenico ........ G04C 5/005
2018/0113423 A1* 4/2018 Di Domenico ........ G04B 15/06
2019/0294116 A1* 9/2019 Jung ...................... G04B 21/06
2020/0089168 A1* 3/2020 Di Domenico ...... G04B 17/045
(Continued)

FOREIGN PATENT DOCUMENTS

CH 706754 A2 * 1/2014 ............ G04B 21/08
CN 2 140 535 Y 8/1993
CN 101093385 A 12/2007
(Continued)

OTHER PUBLICATIONS

European Search Report No. 21 17 9632 dated Jan. 21, 2022.
(Continued)

*Primary Examiner* — Edwin A. Leon
*Assistant Examiner* — Kevin Andrew Johnston
(74) *Attorney, Agent, or Firm* — Sughrue Mion, PLLC

(57) ABSTRACT

A micromechanical mechanism (1), in particular for an horological movement (3), the mechanism including a micromechanical device including a mobile element (8) needing to be moved mechanically to trigger its operation. Included is a system for actuating the device, the actuation system including a mobile striker (16, 17, 18) configured to go from a release position (19) to a percussion position (21) in which it transmits to the mobile element (8) a momentum necessary for the release of the device, the actuation system further including a magnet (15) configured to attract the mobile striker (16, 17, 18) in a percussion position (21). Also a horological movement (3) including such a mechanism (1).

18 Claims, 5 Drawing Sheets

(56) References Cited

U.S. PATENT DOCUMENTS

2020/0183333 A1* 6/2020 Stranczl ................. G04B 31/02

FOREIGN PATENT DOCUMENTS

| | | |
|---|---|---|
| CN | 106054574 A | 10/2016 |
| EP | 3 079 024 A1 | 10/2016 |

OTHER PUBLICATIONS

Anonymous, Gauss Guns, URL: https://web.archive.org/web/20210428223905/https://www.kjmagnetics.com/blog.asp?p=gauss-guns, Apr. 28, 2021, 8 pages total.

Chinese Office Action dated Sep. 23, 2023 in Application No. 202210669272.5.

* cited by examiner

MICROMECHANICAL MECHANISM PROVIDED WITH A PERCUSSION ACTUATION SYSTEM, IN PARTICULAR FOR HOROLOGY

CROSS REFERENCE TO RELATED APPLICATION

This application claims priority to European Patent Application No. 21179632.1 filed Jun. 15, 2021, the entire contents of which are incorporated herein by reference.

TECHNICAL FIELD OF THE INVENTION

The invention relates to a micromechanical mechanism provided with a percussion actuation system, in particular for horology.

The invention also relates to an horological movement including such a micromechanical mechanism.

TECHNOLOGICAL BACKGROUND

In the field of horology, various sorts of complications are known, some of which require a specific actuation device, in particular because they require occasional release.

For example, a striking-mechanism can be combined with a conventional horological movement to act in particular as minute-repeaters or to signal a programmed alarm time. Such a striking-mechanism generally comprises at least one gong made of sapphire, of quartz or of a metal material, such as of steel, of bronze, of precious metal or of metallic glass. This gong can describe for example at least one portion of a circle around the horological movement in the watch frame. The gong is fastened by at least one of its ends to a gong carrier, which is itself rigidly connected to a watch plate.

To actuate the striking-work, a hammer of the mechanism is rotatably mounted on the plate for example near the gong carrier in such a way as to strike the gong to make it vibrate. The sound produced by the gong struck by the hammer is located in particular in the range of audible frequencies from 1 kHz to 20 kHz. This allows to signal to the wearer of the watch a well-defined time, a programmed alarm or a minute-repeater.

As shown in the patent document EP 1 574 917 A1, the striking-mechanism of a watch can comprise two gongs or more fastened by one of their ends to the same gong carrier, which is itself rigidly connected to a plate. Each gong can be struck by a respective hammer. To do this, each hammer is driven by its own drive spring, which must have been previously wound, in such a way as to drive the hammer against the gong, in order to signal a minute-repeater or an alarm time. Two shock-absorber counter-springs are provided each to push back and maintain the two hammers at a distance from the gongs in a rest mode. In a striking-work mode, the shock-absorber counter-springs act with a significant force and slow down the drop of each hammer before the strike against the respective gong. These counter-springs allow after the strike to push each hammer back to their rest position. Excentrics are also provided for setting the operation of the counter-springs to avoid substantially any rebound of each hammer against the respective gong.

One disadvantage of the known actuation systems is due to the quantity of energy that they require to operate in an optimal manner. This energy is either provided by the barrel, or by manual actuation.

For example, in the case of a striking-work, the hammer must be actuated automatically to operate, in particular via the energy provided by the barrel.

In the case of manual pressure, the pressure required can be relatively significant, which is not pleasant for the person who uses the mechanism.

More generally, there can also be a need for an actuation system, which operates continually. For example, in the case of an escapement mechanism, the movement must be maintained at a predefined frequency. However, at present, there are few alternatives to an escapement wheel cooperating with pallets, the energy consumption of which is significant. Detent escapement mechanisms, which do not include pallets, are known. However, these mechanisms are complex to implement and to actuate.

SUMMARY OF THE INVENTION

The goal of the invention is therefore to overcome the disadvantages of the aforementioned prior art by providing an innovative actuation system, in particular for a timepiece, with the goal of avoiding a significant use of energy necessary for its operation.

For this purpose, the invention relates to a micromechanical mechanism, in particular for a horological movement, the mechanism including a micromechanical device having a specific function, the device including a mobile element needing to be moved mechanically to trigger its operation.

The mechanism is remarkable in that it comprises a system for actuating the device, the actuation system including a mobile striker configured to go from a release position to a percussion position in which it transmits to the mobile element a momentum necessary for the release of the micromechanical device, the actuation system further including a magnet configured to attract the mobile striker in a percussion position.

On the one hand, the force of attraction of the magnet is used to place the striker in a percussion position. On the other hand, the striker transmits a necessary momentum to the mobile element. Via the momentum of the striker, the mobile element receives enough energy to release the micromechanical device. Thus, the energy necessary for the actuation of the striker and/or of the mobile element is saved. Moreover, the energy transmitted substantially corresponds to the momentum of the striker and is therefore relatively constant, independently of the energy of the system for actuating the striker, the system thus forming a system with a constant force.

Via the invention, the energy of actuation of the micromechanical device is lesser. According to the actuation system, the barrel is less stressed, or the manual actuation is easier.

Moreover, by selecting a particular difference in mass between the mobile element and the striker, the speed of the mobile element can be adapted. For example, a mobile element having a reduced mass, which moves with a speed greater than that of the striker having a greater mass, can be chosen. A lighter mobile element moving quickly reduces the risk of rebound after the shock against the gong.

According to a specific embodiment of the invention, the mobile element comprises a magnetically conductive material.

According to a specific embodiment of the invention, the striker comprises a magnetically conductive material, so as to be attracted by the magnet.

According to a specific embodiment of the invention, the mobile element is in contact with the magnet in its rest position.

According to a specific embodiment of the invention, the striker is configured to strike the magnet in such a way as to give an impulse to the mobile element.

According to a specific embodiment of the invention, the distance between the position of release of the striker and the magnet is chosen so that the magnet attracts the striker against it in its percussion position.

According to a specific embodiment of the invention, the momentum transmitted by the striker is sufficiently great to overcome the retaining force of the magnet acting on the mobile element, so that the mobile element detaches from the magnet.

According to a specific embodiment of the invention, the mechanism comprises a flexible guide on which the mobile element is mounted to allow it to move between its rest position and its shock position.

According to a specific embodiment of the invention, the flexible guide is configured to press the mobile element against the magnet.

According to a specific embodiment of the invention, the actuation system comprises a flexible guide on which the striker is mounted to allow it to move between the release position and the percussion position.

According to a specific embodiment of the invention, the flexible guide includes a flexible blade or a flexible neck.

According to a specific embodiment of the invention, the actuation system comprises a rotary device provided with the striker, the rotary device being configured to bring the striker into the release position.

According to a specific embodiment of the invention, the actuation system comprises at least one additional striker, preferably two additional strikers, arranged on the rotary device, in such a way as to alternatingly bring each striker into the release position.

According to a specific embodiment of the invention, the rotary device comprises a rotary hub.

According to a specific embodiment of the invention, the rotary device comprises at least one arm, each arm carrying a striker.

According to a specific embodiment of the invention, the rotary device comprises several arms distributed angularly around the hub.

According to a specific embodiment of the invention, the mass of the striker is greater than that of the mobile element, for example, the mass of the striker is at least two times greater than that of the mobile element.

According to a specific embodiment of the invention, the micromechanical device is a striking-work, the device including at least one resonating element allowing to emit a sound when it is struck, the mobile element being a hammer mobile between the rest position and the shock position in which it strikes the resonating element to make it vibrate.

According to a specific embodiment of the invention, the micromechanical mechanism is a setting member provided with a balance, an escapement mechanism provided with an escapement wheel and a detent lever cooperating with the escapement wheel, the balance being actuated by the mobile element.

According to a specific embodiment of the invention, the mobile element strikes the balance in a shock position.

According to a specific embodiment of the invention, the mobile element strikes the balance in a shock position, preferably with a single impact.

According to a specific embodiment of the invention, the balance comprises an unlocking gathering-pallet arranged to move the detent lever in order to free the escapement wheel.

According to a specific embodiment of the invention, the device can be released occasionally.

According to a specific embodiment of the invention, the magnet is stationary with respect to the horological movement.

The invention also relates to a horological movement including such a micromechanical mechanism.

BRIEF DESCRIPTION OF THE DRAWINGS

Other specificities and advantages will be clear from the description made thereof below, for informational and in no way limiting purposes, in reference to the appended drawings, in which.

DETAILED DESCRIPTION OF THE INVENTION

As explained above, the invention relates to a micromechanical mechanism, which has a specific function of striking-work 1 in the first embodiment. Specific function means a micromechanical function different than the usual function linked to the display of the time.

Figure 1:
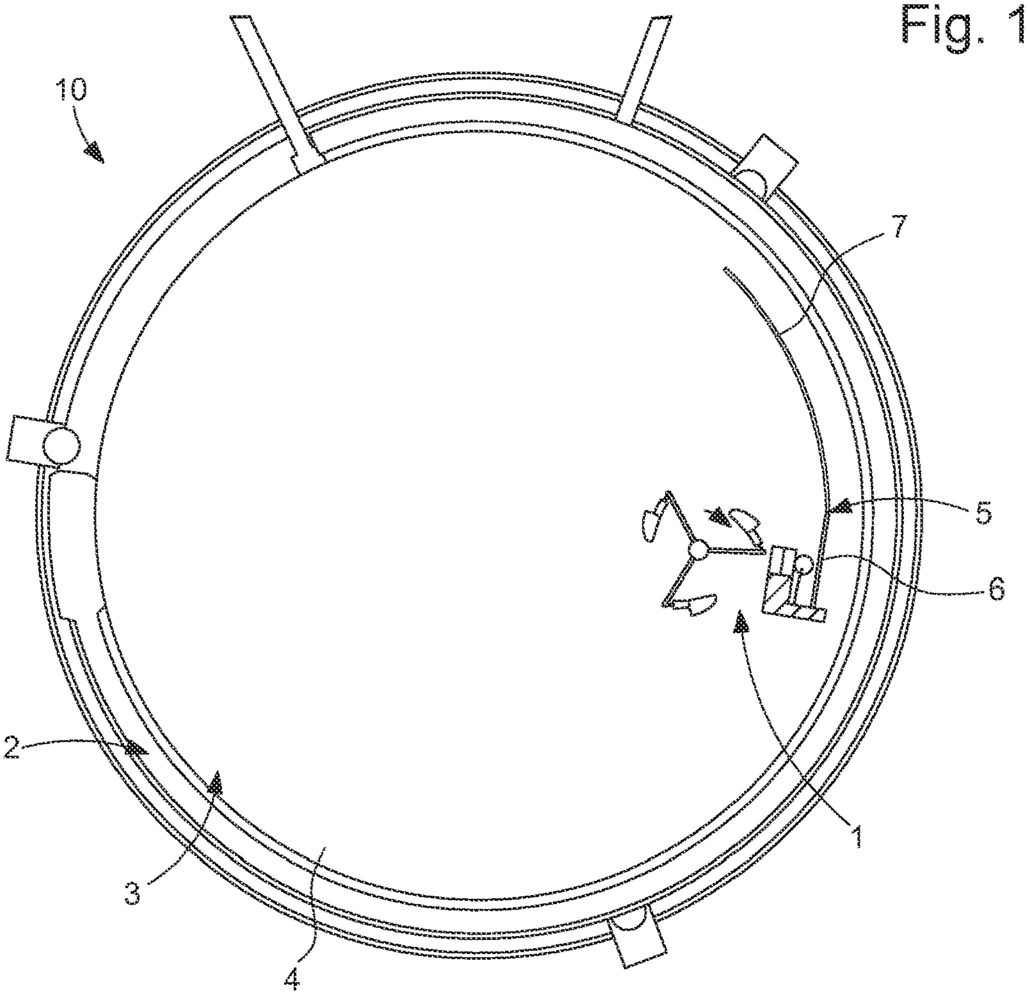
FIG. 1 is a diagram of a timepiece including a percussion striking-work micromechanical mechanism according to a first embodiment of the invention.
Figure 2:
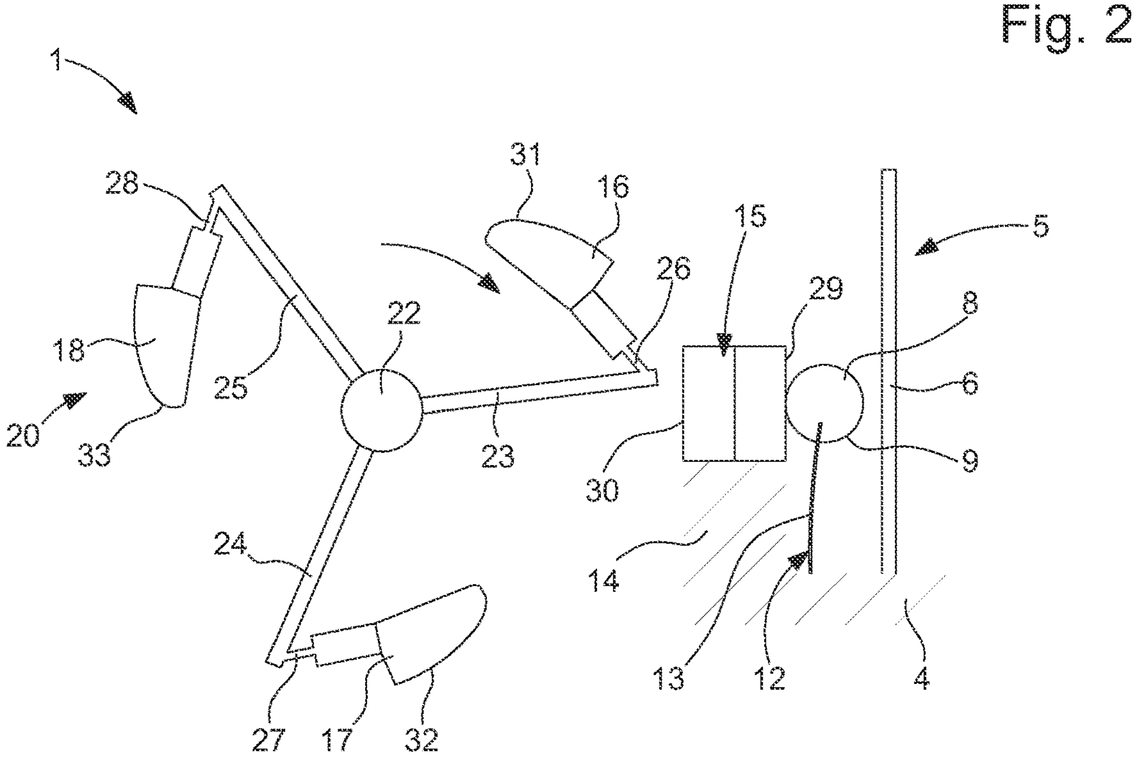
FIG. 2 is an enlarged diagram of the striking-work micromechanical mechanism of FIG. 1.

The striking-mechanism 1 is intended for a timepiece 10, like a watch shown in FIG. 1. The timepiece 10 comprises a middle 2 and a horological movement 3, preferably mechanical, which is for example provided with a plate 4 and with a barrel spring to provide the operating energy. The embodiment described below is based on the combination of the principle of “Gauss magnetic cannon” and of the principle of conservation of momentum during a shock.

In FIGS. 1 to 5, the striking-mechanism 1 comprises a micromechanical device provided with a resonating element 5, for example a gong conventionally used in horological striking-works. The resonating element 5 allows to emit a sound when it is struck. In the drawings, the resonating element 5 is a rod comprising a rectilinear portion 6. The resonating element 5 is preferably fastened to the plate 4, in such a way as to extend above and next to the plate 4, for example in a plane parallel to that of the plate 4.

Other configurations of the resonating element 5 are possible. The resonating element 5 can further comprise a circular portion 7, shown in FIG. 1, in particular to run along the inner face of the middle 2.

To emit a sound, the mechanism 1 comprises a mobile element 8, here a hammer, which is mobile with respect to the plate 4. The mobile element 8 is mobile between two positions, a rest position 9 distant from the resonating element 5, and a shock position 11 in which it strikes the resonating element to make it vibrate. Thus, the resonating element 5 produces a vibration that propagates in the watch. The outer part of the watch radiates these vibrations in such a way as to emit a sound. Other embodiments are possible with varied shapes of mobile element and of resonating element 5.

The mechanism 1 comprises here a flexible guide 12 on which the mobile element 8 is mounted to allow it to move between its rest position 9 and its shock position 11. The flexible guide 12 preferably comprises a first flexible blade 13 assembled to the plate 4 on the one hand, and to the mobile element 8 on the other hand. The first flexible blade 13 is preferably arranged in a manner substantially parallel to the resonating element 5 when the mobile element 8 is in a rest position 9.

By the elastic deformation of the first flexible blade 13, the mobile element 8 goes from the rest position 9 to the shock position 11 and vice versa.

The mechanism 1 further includes a magnet 15 stationary with respect to the plate 4. The magnet 15 is preferably assembled onto the plate 4. The magnet 15 is for example disposed on a promontory 14 facing the resonating element 5.

Preferably, the magnet 15 is configured to retain the mobile element 8 in its rest position 9. For this goal, the mobile element 8 includes a magnetically conductive material, which induces a force of attraction of the mobile element 8 against the magnet 15.

Alternatively, a mobile element 8 not comprising magnetically conductive material can be chosen. In this case, the flexible guide 12 is configured to apply a prestress onto the mobile element, in such a way as to press it against the magnet 8.

Thus, in the rest position 9, the mobile element 8 is in contact with a front face 29 of the magnet 15. The mobile element 8 keeps this position permanently, except in the moments in which it strikes the resonating element 5. The flexible guide 12 is assembled onto the plate 4 between the promontory 14 and the resonating element 5. Thus, the mobile element 8 can move between the magnet 15 and the resonating element 5 via the flexible guide 12.

The front face 29 preferably has a substantially flat surface. The mobile element 8 has for example a cylindrical or spherical shape. These rounded shapes allow to more easily separate the mobile element 8 from the front face 29 of the magnet 15.

According to the invention, the mechanism 1 comprises a system for actuating the mobile element 8. This system is configured to incite the movement of the mobile element 8 from its rest position 9 to its shock position 11. In particular, it is used to separate the mobile element 8 from the magnet 15 and allow it to reach the resonating element 5. The actuation system comprises the magnet 15.

For this purpose, the actuation system 20 includes at least one mobile striker 16, 17, 18 configured to transmit to the mobile element 8 a momentum sufficient for it to go from its rest position 9 to its shock position 11 and to make the resonating element 5 vibrate.

The striker 16, 17, 18 is configured to go from a release position 19 to a percussion position 21 in which it transmits a momentum to the mobile element 8.

In the embodiment of FIGS. 1 to 5, the actuation system comprises a rotary device 20 provided with three mobile strikers 16, 17, 18.

The rotary device 20 comprises a hub 22 and three arms 23, 24, 25, angularly distributed around the hub 22, and connected to the hub 22 by one end. Each arm 23, 24, 25 carries a mobile striker 16, 17, 18 disposed at the opposite end of the arm 23, 24, 25 with respect to the hub 22. The arms 23, 24, 25 are preferably arranged in the same plane substantially perpendicular to the axis of the hub 22. This plane also preferably passes through the magnet 15, the mobile element 8 and the resonating element 5.

The system can comprise a number of arms and of strikers greater or lesser than those illustrated in the embodiment described.

Each mobile striker 16, 17, 18 is mounted on an arm 23, 24, 25 in such a way as to form an angle with the arm 23, 24, 25. The angle is typically comprised between 30 and 60°, when the mobile striker 16, 17, 18 is in a release position 19, and the angle is typically between 60 and 90°, when the mobile striker 16, 17, 18 is in a percussion position 21. An arm can, for example, be an oblong body, a train wheel or a plate.

Preferably, each mobile striker 16, 17, 18 is mounted on the arm 23, 24, 25 by a flexible guide to allow it to move with respect to the arm 23, 24, 25, and to go from the release position 19 to the percussion position 21. The flexible guide includes here a second flexible blade 26 assembled to the mobile striker 16, 17, 18 on the one hand, and on the other hand to the end of the arm 23, 24, 25.

Each mobile striker 16, 17, 18 comprises a contact face 31, 32, 33, which is intended to come in contact with the magnet 15, when it goes from the release position 19 to the percussion position 21. The contact faces 31, 32, 33 of the mobile strikers 16, 17, 18 are preferably rounded, to allow easier unhooking when the mobile striker 16, 17, 18 returns to its release position.

When the rotary device 20 rotates, it positions one of the mobile strikers 16, 17, 18 facing the magnet 15. The mobile striker 16, 17, 18 then goes from the release position 19 to the percussion position 21 according to a radial movement. Once the percussion has been carried out, the rotary device 20 continues to rotate in order to avoid the mobile striker 16, 17, 18 remaining against the magnet 15. The geometry of the mobile strikers 16, 17, 18 is created in such a way as to require the least torque possible on the rotary device 20. For example, a contact face 32 having the shape of a ramp tangential to the rotary movement is chosen.

The rotary device 20 is actuated by rotating the hub 22 about its axis, so that the arms 23, 24, 25 rotate about the axis of the hub 22. Thus, the mobile strikers 16, 17, 18 also rotate about the axis of the hub 22 while remaining in a release position 19. In other words, the mobile strikers 16, 17, 18 remain in the same position with respect to the arms 23, 24, 25, which carry them.

To rotate, the hub 22 is mechanically connected to the barrel of the movement via gear means, not shown in the drawings. These gear means comprise for example an actuation system configured to determine the striking-works to be executed according to the time displayed by the movement 3, to act in particular as minute-repeaters or to signal a programmed alarm time. Thus, when one or more striking-works must sound, the actuation system releases the rotation of the hub 22.

Figure 3:
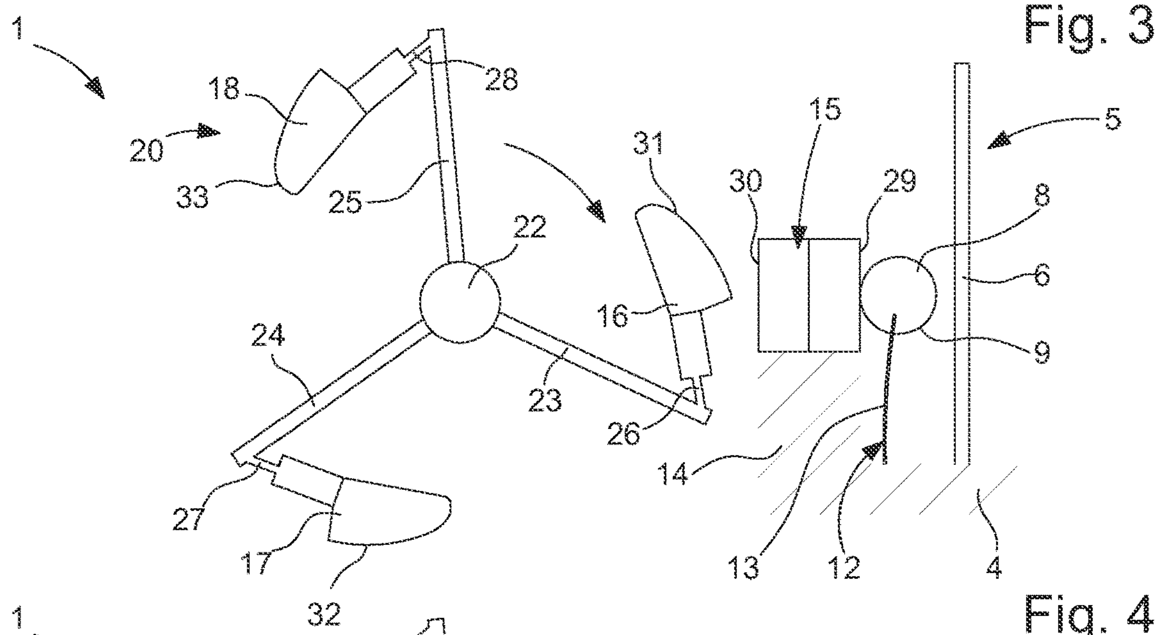
FIG. 3 is a diagram of the striking-work micromechanical mechanism of FIG. 1, in which the striker is in a release position.

The rotary device 20 is configured to bring the striker into a release position 19 in front of the magnet 15. FIG. 3 shows an example in which the striker is in a release position 19 closest to the magnet 15. The magnet 15 presents an opposite face 30 oriented towards the rotary device 20, so that the opposite face 30 of the magnet 15 and a contact face 31, 32, 33 of a mobile striker 16, 17, 18 are facing when the rotary device 20 rotates. The opposite face 30 preferably has a substantially flat surface.

The force of attraction of the magnet 15 and the distance between the contact face 31, 32, 33 of the mobile striker 16, 17, 18 in a release position 19 and the opposite face 30 of the magnet 15 are chosen so that the magnet 15 attracts the striker 16 against its opposite face 30, when it passes in front of its opposite face 30. Thus, the magnetic potential energy produced by the magnet 15 acting on the mobile striker 16, 17, 18 is transformed into kinetic energy by the mobile striker 16, 17, 18. This kinetic energy is transmitted to the mobile element 8 by the shock of the mobile striker 16, 17, 18.

Indeed, when the mobile striker 16, 17, 18 is attracted by the magnet 15, it is accelerated and strikes the magnet 15. When the mobile striker 16, 17, 18 comes into collision with the opposite face 30 of the magnet 15, at least a part of its momentum is transmitted to the mobile element 8 through the magnet 15, the mobile element 8 being disposed against the front face 29 of the magnet in a rest position.

This principle of transmission of movement combined with a magnetic attraction is known by the name of "Gauss cannon". The attraction of the magnet 15 guarantees a minimum intensity at each strike of the mobile element 8. The striking-work that results therefrom is more constant over the entire duration of the striking-work, independently of the torque of the barrel.

Figure 4:
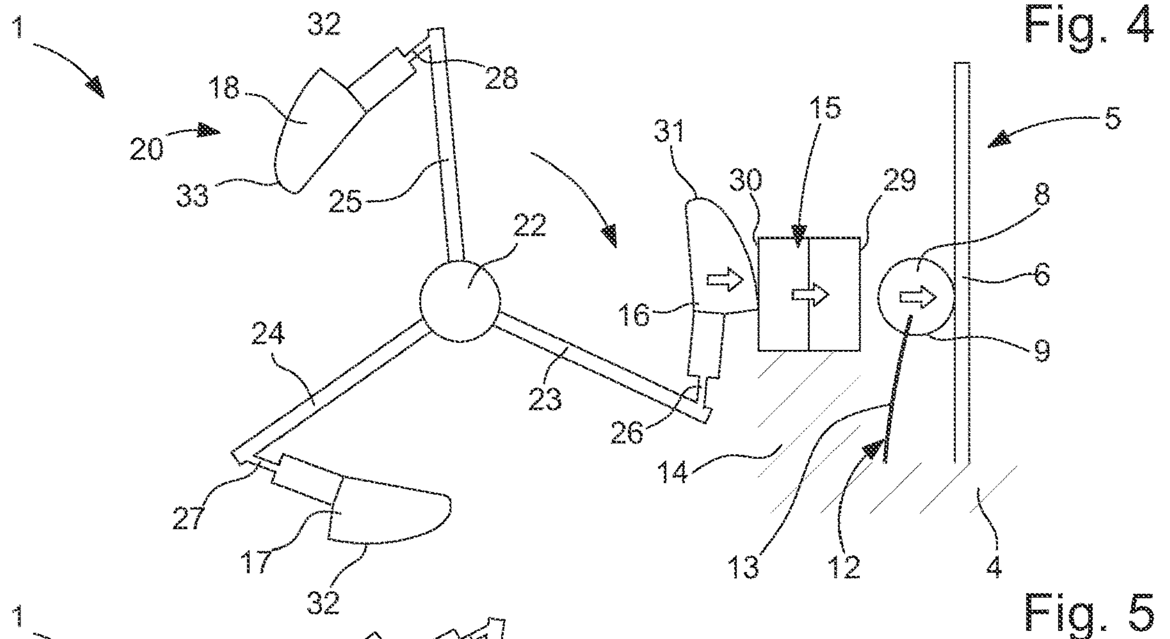
FIG. 4 is a diagram of the striking-work micromechanical mechanism of FIG. 1, in which the striker is in a percussion position with the magnet and the mobile element, here a hammer, in a position of shock with the gong.

As shown in FIG. 4, each mobile striker 16, 17, 18 is configured to strike the magnet 15 in such a way as to give an impulse to the mobile element.

Moreover, the mobile strikers 16, 17, 18 and the rotary device 20 are configured for the momentum transmitted to the mobile element 8 by the striker 16, 17, 18 to be greater than the retaining force of the magnet acting on the mobile element 8, so that the mobile element detaches from the magnet 15 and strikes the resonating element 5 with sufficient force, as shown in FIG. 4.

Figure 5:
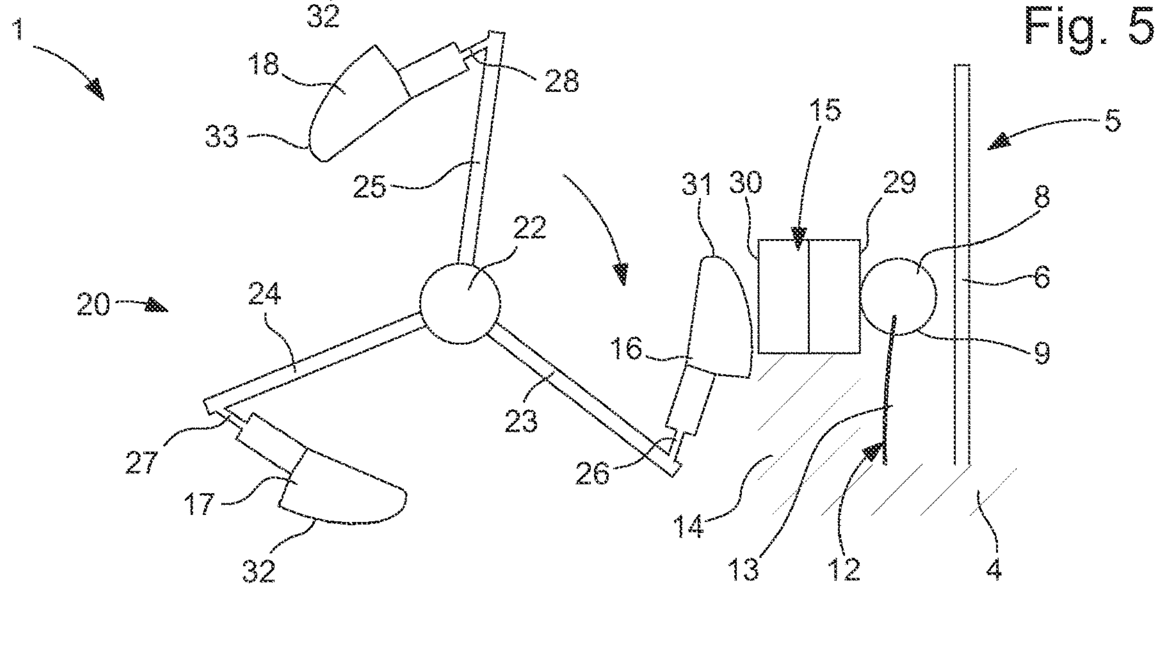
FIG. 5 is a diagram of the striking-mechanism of FIG. 1, in which the striker is no longer in a percussion position nor in a release position and the mobile element has come back to a rest position.

As shown in FIG. 5, the magnet 15 and the mobile element 8 are further configured in order for the front face 29 to attract the mobile element 8 against it, after the latter has struck the resonating element 5. Thus, the mobile element 8 returns into its rest position 9, and can again be actuated by the following mobile striker 16, 17, 18. The mobile element 8 rebounding and again striking the resonating element 5 in an untimely manner is thus avoided.

In the case of a mobile element 8 not including magnetically conductive material, the flexible guide 12 brings the mobile element back against the magnet 15.

By continuing to rotate, the rotation device 20 pulls on the mobile striker 16, 17, 18 in order for the latter to detach from the opposite face 30 of the magnet 15. At the same time, when the hub 22 rotates, the following mobile striker 16, 17, 18 moves closer to the magnet 15.

The rotation device 20 is actuated by the movement, when a striking-work is necessary. Thus, the striking-work automatically sounds via the mobile strikers 16, 17, 18, the magnet 15, the mobile element 8 and the resonating element 5.

During operation, each mobile striker 16, 17, 18 strikes the magnet 15 one after the other, to produce a sound each time. At each percussion of mobile striker 16, 17, 18, the mobile element 8 strikes the resonating element 5, and comes back to a rest position 9 against the magnet 15 between two successive percussions.

According to the number of strikes of striking-works to be emitted, the rotation device is actuated for a predefined time.

Preferably, the rotation is carried out at a constant speed in order for the strikes of striking-works to be emitted periodically at the same frequency.

The speed of rotation can also be variable to emit a particular striking-work.

FIGS. 6 to 11 show a second embodiment of the invention, in which the micromechanical mechanism 10 is a setting member for a horological movement. The micromechanical device comprises a detent escapement mechanism, a mobile element 8 and a balance plate 36. The escapement mechanism comprises a rotary escapement wheel 34 provided with peripheral teeth 35 capable of cooperating with a notch 42 for stopping the rotation of the escapement wheel 34. The escapement wheel 34 is preferably mechanically connected to means for driving the movement, for example a barrel.

The escapement mechanism further includes a detent lever 40 cooperating with the balance plate 36. During its actuation, the balance plate 36 carries out an alternating movement in the clockwise and anticlockwise directions.

The detent lever 40 comprises the stopping notch 42 allowing to retain the escapement wheel 34.

The detent lever 40 further includes a flexible blade 41 at one end, the flexible blade being capable of cooperating with the balance plate 36 to allow the balance to unlock the detent lever during its anticlockwise rotation. The flexible blade 41 is fastened onto the detent lever 40 and is arranged longitudinally in the extension of the detent lever 40. The detent lever 40 includes a catch 43 at its end in order to retain the flexible blade 41 during a movement towards the right. When the balance plate 36 rotates in the clockwise direction, the flexible blade 41 can move away from the catch 43 without the detent lever 40 moving. When the balance plate rotates in the anticlockwise direction, the blade 41 bears against the catch 43 and angularly moves the detent lever in such a way as to unlock the stopping notch 42 of the escapement wheel 34.

The balance plate 36 has a circular shape, for example a disc, and is provided with an unlocking gathering-pallet 37 and with an impulse gathering-pallet 38 arranged on the periphery of the disc 36, and extending on two different levels above the disc, preferably near one another. Here, the unlocking gathering-pallet 37 extends above the impulse gathering-pallet 38.

During an anticlockwise rotation, the unlocking gathering-pallet 37 allows to move the detent lever 40 to unlock the stopping notch 42 of the tooth 35 of the escapement wheel 34 in order for the latter to be able to rotate.

The impulse gathering-pallet 38 allows to receive an impulse from the mobile element 8 to incite the rotation of the balance plate 36, here in the anticlockwise direction.

The detent lever 40 extends longitudinally, and is arranged at the unlocking gathering-pallet 37, and the mobile element 8 is arranged at the impulse gathering-pallet 38. Thus, the detent lever 40 is above the mobile element 8.

The detent lever 40 is disposed tangentially to the escapement wheel 34, in an oblique manner up to the balance plate 36 at its end 41. The detent lever 40 is maintained by a flexible blade 39 in the extension of the second end.

The actuation system 20 is identical to the first embodiment. The rotary device 20 is mounted on the escapement wheel 34 in a plane parallel to that of the escapement wheel 34. Thus, when the escapement wheel 34 rotates, the rotary device 20 also rotates.

The rotary device 20 is configured to bring a striker 16, 17, 18 into a release position 19 in front of the magnet 15. The actuation mechanism functions in a manner similar to that of the first embodiment.

FIGS. 6 to 11 show various steps of the dynamics of the micromechanism, which are described above.

Figure 6:
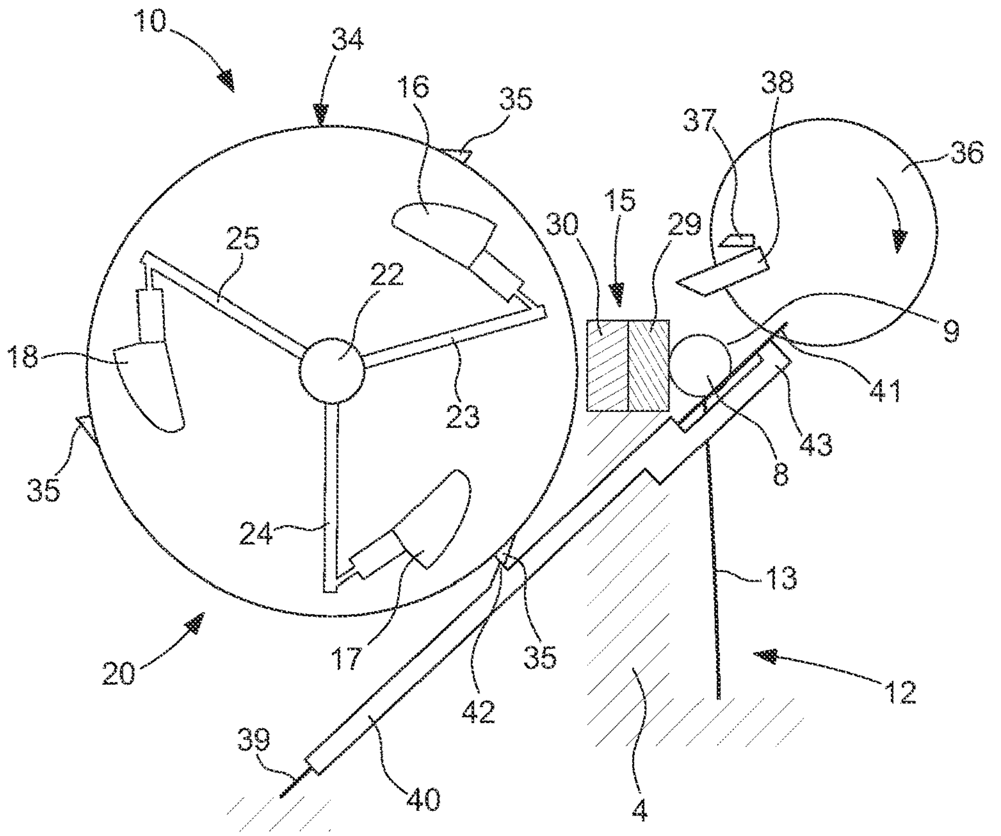
FIG. 6 is a diagram of a percussion escapement micromechanical mechanism according to a second embodiment of the invention.

In FIG. 6, the stopping notch 42 of the detent lever 40 blocks the rotation of the escapement wheel 34. The mobile element 8 is in contact with the magnet 15 in its rest position 9. The strikers 16, 17, 18 of the rotary device are in positions which do not allow to actuate the mobile element 8.

The balance plate 36 is in rotation about its axis of rotation in the clockwise direction, according to the arrow indicated.

The balance plate 36 carries out a clockwise/anticlockwise rotation alternatingly at each actuation at a predefined frequency.

Figure 7:
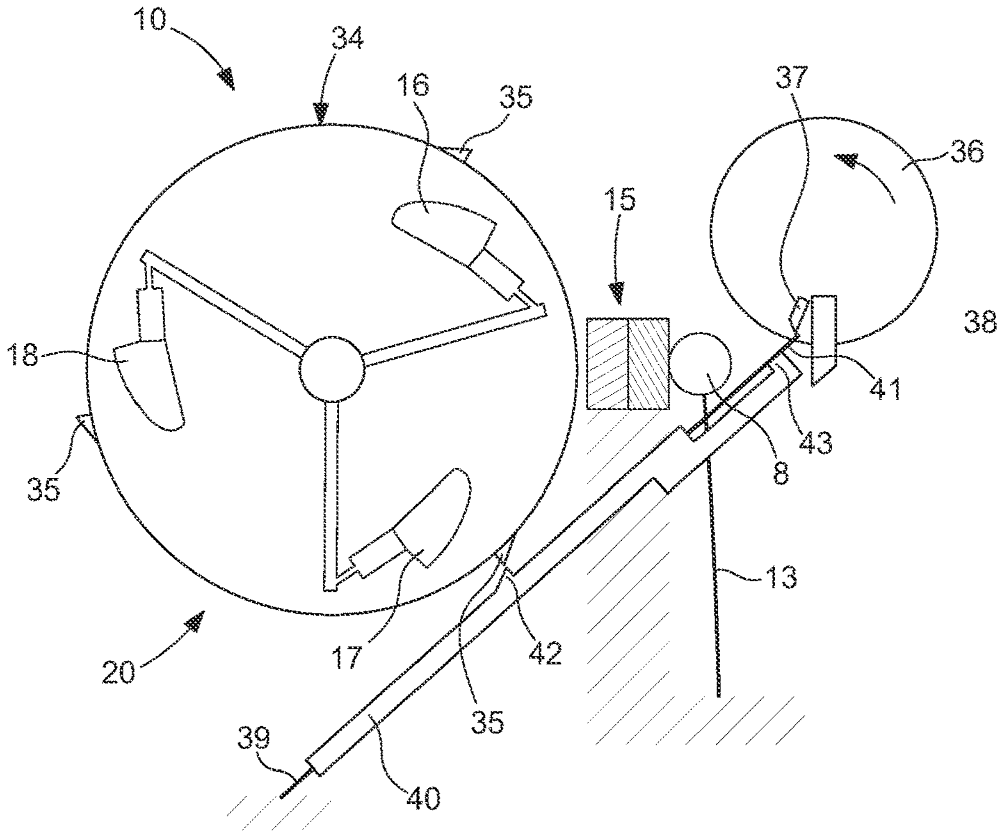
FIG. 7 is a diagram of the escapement micromechanical mechanism of FIG. 6, in which the detent lever is moved by the balance.

As shown in FIG. 7, during the passage in the anticlockwise direction, of the unlocking gathering-pallet 37 comes in contact with the flexible blade 41 of the detent lever 40. Thus, the detent lever 40 is moved laterally, so that the stopping notch 42 is offset from the tooth 35 in order to free the escapement wheel 34.

Figure 8:
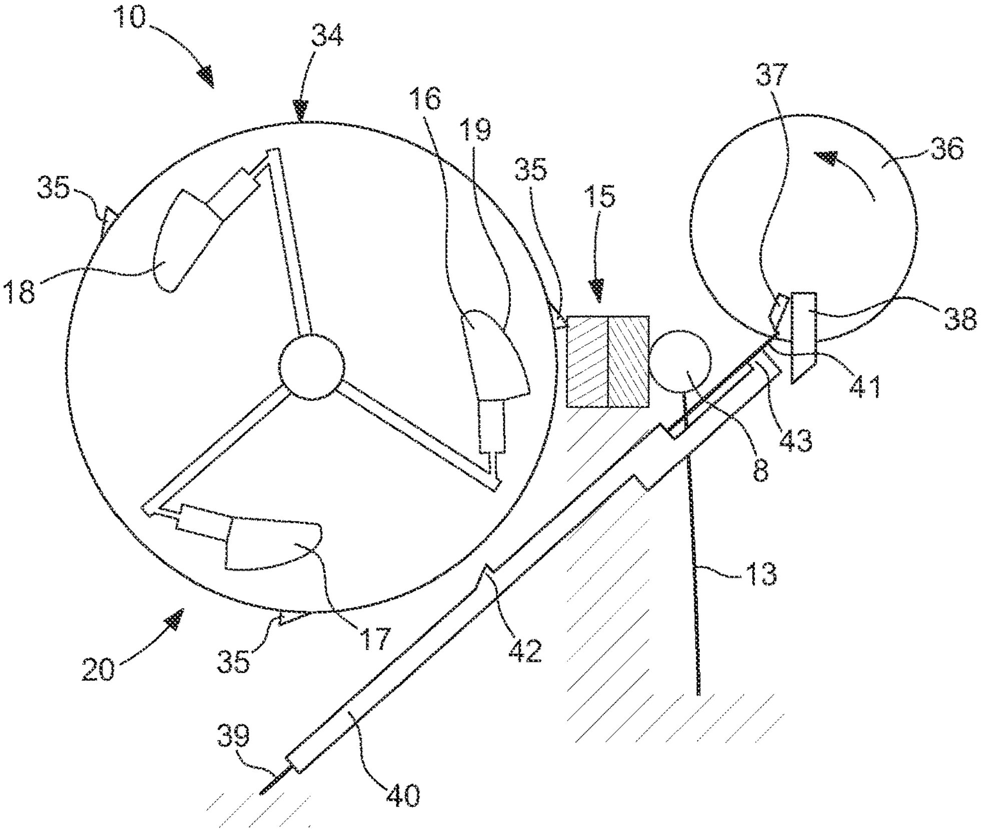
FIG. 8 is a diagram of the escapement micromechanical mechanism of FIG. 6, in which the striker is in a release position.
Figure 9:
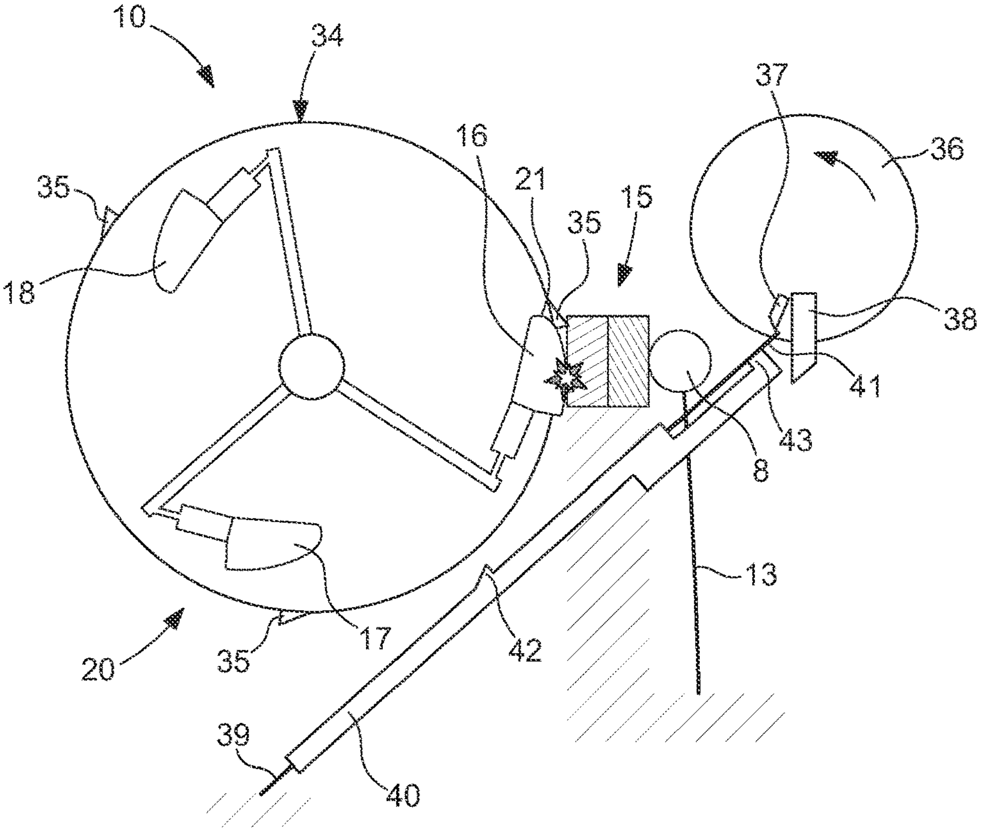
FIG. 9 is a diagram of the escapement micromechanical mechanism of FIG. 6, in which the striker is in a position of percussion with the magnet.

Thus, the escapement wheel 34 can rotate about its axis of rotation. In FIG. 8, the rotation of the escapement wheel 34 brings a striker 16 into a release position 19 to actuate the actuation system 20. Attracted by the magnet 8, the striker 16 moves into a percussion position 21 against the magnet 15, and transmits a momentum to the mobile element 8, as shown by FIG. 9.

Figure 10:
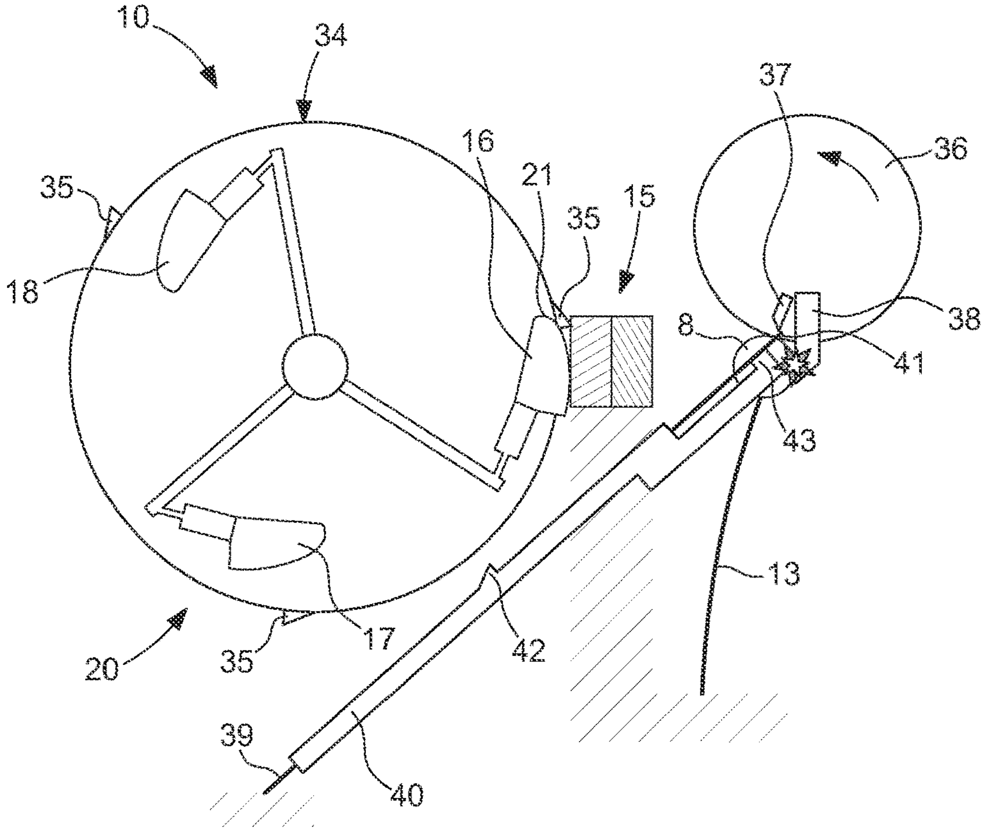
FIG. 10 is a diagram of the escapement micromechanical mechanism of FIG. 6, in which the mobile element is in a position of shock with the balance.

In FIG. 10, when the mobile element 8 receives the momentum via the magnet 15, the mobile element 8 strikes the impulse gathering-pallet 38 of the balance plate 36 in a shock position 11. The energy transmitted to the balance plate 36 is received in the form of a single occasional shock. This form of impulse is advantageous, from a chronometric point of view, as a person skilled in the art knows.

Figure 11:
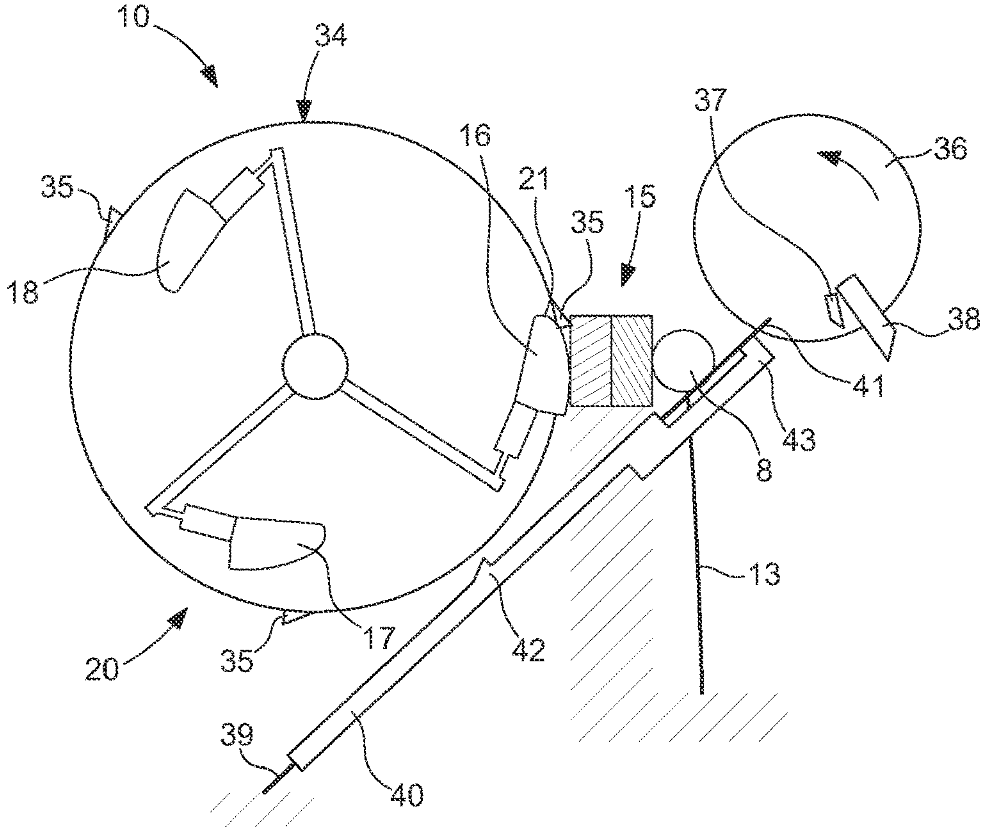
FIG. 11 is a diagram of the escapement mechanism of FIG. 6, in which the balance is in motion.

Thus, at least a part of the momentum transmitted by the striker 16 to the mobile element 8 is provided to the balance plate 36. The momentum is sufficient for the balance 36 to continue its rotation and maintain its amplitude, here in the anticlockwise direction, as shown by FIG. 11.

A spring-spiral, not shown in the drawings, applies a return force to the balance, so that the balance plate 36 then carries out a rotation in the clockwise direction, after having reached its extreme position in the anticlockwise direction.

In the clockwise direction, the unlocking gathering-pallet 37 comes in contact with the flexible blade 41, which bends to let the unlocking gathering-pallet 37 pass. Indeed, in this direction, the flexible blade 41 is not retained by a catch. The escapement wheel 34 is not affected by the bending of the flexible blade 41. The passage of the gathering-pallet 37 only raises the blade 41 without impulsion given, this empty passage being called "missed stroke" by a person skilled in the art.

Thus, as shown by FIG. 6, the balance plate 36 continues its rotation in the clockwise direction, until an extreme clockwise position.

Finally, the spiral spring exerts a return force to bring the balance plate 36 back in the anticlockwise direction, until the unlocking gathering-pallet 37 is retained by the flexible blade 41 of the detent lever 40, as shown by FIG. 7.

During the rotations of the balance plate 36, the mobile element 8 comes back against the magnet 15, while the detent lever 40 gets back to its initial position, the stopping notch 42 blocking the escapement wheel 36 by contact with the following peripheral tooth 35 of the escapement wheel 34.

The actuation mechanism allows to keep up the movement of the balance, and consequently the movement of the setting member and of the escapement mechanism. The frequency of the balance determines the frequency of operation of the setting member. Thus, it is possible to maintain the oscillation with a system of the Gauss cannon type.

Of course, the present invention is not limited to the illustrated examples of a striking-mechanism and a setting member, but it is capable of various alternatives and modifications which will appear to a person skilled in the art.

In particular, the actuation system can be adapted to other types of micromechanical devices comprising a mobile element. For example, the mobile element can be a disc for display of the date type.

The actuation system can be connected to a push button of the timepiece. By pressure on the push button, via a mechanical relay, such as gears, the striker is placed in a release position, for example by rotating the hub. Thus, such an actuation system can be used to release a micromechanical device manually on demand.

The invention claimed is:

1. A micromechanical mechanism (1), the mechanism comprising:

a micromechanical device having a specific function, the device including a mobile element (8) needing to be moved mechanically to trigger an operation thereof; and a system for actuating the device, the actuation system including a mobile striker (16, 17, 18) configured to go from a release position (19) to a percussion position (21) in which the striker transmits to the mobile element (8) a momentum necessary for a release of the micromechanical device, the actuation system further including a magnet (15) configured to attract the mobile striker (16, 17, 18) in a percussion position (21)

wherein the mobile element (8) is in contact with the magnet (15) in a rest position (9).

2. The micromechanical mechanism according to claim 1, wherein the mobile striker (16, 17, 18) is configured to strike the magnet (15) in such a way as to give an impulse to the mobile element (8) via the magnet (15).

3. The micromechanical mechanism according to claim 2, wherein a distance between the release position (19) of the mobile striker (16, 17, 18) and the magnet (15) is chosen so that the magnet (15) attracts the mobile striker (16, 17, 18) against the percussion position (21).

4. The micromechanical mechanism according to claim 3, wherein the momentum transmitted by the mobile striker (16, 17, 18) overcomes a magnetic retaining force of the magnet (15) acting on the mobile element (8), so that the mobile element (8) detaches from the magnet (15).

5. The micromechanical mechanism according to claim 1, further comprising a flexible guide (12) on which the mobile element (8) is mounted to allow the mobile element (8) to move between a rest position (9) and a shock position (11).

6. The micromechanical mechanism according to claim 1, wherein the actuation system comprises a flexible guide on which the mobile striker (16, 17, 18) is mounted to allow the mobile striker to move between the release position (19) and the percussion position (21).

7. The micromechanical mechanism according to claim 6, wherein the flexible guide (12) includes a flexible blade (13, 26, 27, 28) or a flexible neck.

8. The micromechanical mechanism according to claim 1, wherein the actuation system comprises a rotary device (20) provided with the mobile striker (16, 17, 18), the rotary device being configured to bring the mobile striker (16, 17, 18) into the release position (19).

9. The micromechanical mechanism according to claim 8, wherein the actuation system comprises two additional mobile strikers (16, 17, 18), in addition to the mobile striker (16, 17, 18), arranged on the rotary device (20), in such a way as to alternatingly bring each of the mobile striker (16, 17, 18) and the two additional mobile strikers (16, 17, 18) into the release position (19).

10. The micromechanical mechanism according to claim 8, wherein the rotary device (20) comprises a hub (22).

11. The micromechanical mechanism according to claim 10, wherein the rotary device (20) comprises at least one arm (22, 23, 24), each arm (22, 23, 24) carrying one of a plurality of mobile strikers (16, 17, 18), the plurality of mobile strikers (16, 17, 18) comprising the mobile striker (16, 17, 18).

12. The micromechanical mechanism according to claim 11, wherein the rotary device (20) comprises several arms (22, 23, 24) distributed angularly around the hub (22).

13. The micromechanical mechanism according to claim 1, wherein the micromechanical mechanism is a striking-work, the device (1) including at least one resonating element (5) allowing to emit a sound when struck, and a hammer as the mobile element (8) between a rest position (9) and a shock position (11) in which the hammer strikes the resonating element (5) to make the resonating element vibrate.

14. The micromechanical mechanism according to claim 1, wherein the micromechanical mechanism (10) is a setting member provided with a balance, an escapement mechanism provided with an escapement wheel (34) and a detent lever (40) cooperating with the escapement wheel (34), the balance being actuated by the mobile element (8).

15. The micromechanical mechanism according to claim 14, wherein the mobile element (8) strikes the balance in a shock position (11).

16. The micromechanical mechanism according to claim 14, wherein the mobile element (8) strikes the balance in a shock position (11) and with a single impact.

17. The micromechanical mechanism according to claim 14, wherein the balance comprises an unlocking gathering-pallet (37) arranged to move the detent lever (40) in order to free the escapement wheel (34).

18. A horological movement (3) comprising the micro-mechanical mechanism (1) according to claim 1.

* * * * *